United States Patent

Satsuma et al.

Patent Number: 5,479,084
Date of Patent: Dec. 26, 1995

[54] BATTERY DISCHARGING APPARATUS

[75] Inventors: Eiji Satsuma; Tetsuya Okada; Takahiro Yamashita, all of Sumoto, Japan

[73] Assignee: Sanyo Electric Co., Ltd., Osaka, Japan

[21] Appl. No.: 214,466

[22] Filed: Mar. 18, 1994

Related U.S. Application Data

[62] Division of Ser. No. 916,746, Jul. 22, 1992, Pat. No. 5,355,072.

[30] Foreign Application Priority Data

| Jul. 31, 1991 | [JP] | Japan | 3-060416 |
| Nov. 15, 1991 | [JP] | Japan | 3-300530 |
| Jan. 23, 1992 | [JP] | Japan | 4-010146 |
| May 27, 1992 | [JP] | Japan | 4-134951 |

[51] Int. Cl.⁶ ............................... H02J 7/10
[52] U.S. Cl. ................. 320/13; 320/32; 320/48
[58] Field of Search ................. 320/13, 14, 15, 320/48

[56] References Cited

U.S. PATENT DOCUMENTS

| 4,237,385 | 12/1980 | Jurgens et al. | 307/66 |
| 4,742,289 | 5/1988 | Mahlström | 320/14 |
| 4,755,733 | 7/1988 | Laliberte | 320/15 |
| 5,182,509 | 1/1993 | Simmonds | 320/14 |
| 5,223,780 | 6/1993 | Hu | 320/14 |
| 5,280,230 | 1/1994 | Mahoney | 320/14 |
| 5,355,072 | 10/1994 | Satsuma et al. | 320/13 |

FOREIGN PATENT DOCUMENTS 62-193516  8/1987  Japan.

*Primary Examiner*—Steven L. Stephan
*Assistant Examiner*—Nicholas Ponomarenko
*Attorney, Agent, or Firm*—Wenderoth, Lind & Ponack

[57] ABSTRACT

A battery discharging apparatus is provided with a battery discharger and a controller. The controller is connected to a battery voltage sensor and a timer, a current sensor and a discharge switch, or a current sensor and a battery power capacity sensor. The controller directs the discharger to recover battery capacity lost due to the memory effect using a deep memory effect eliminating discharge.

6 Claims, 10 Drawing Sheets

BATTERY DISCHARGING APPARATUS

This application is a divisional of application Ser. No. 07/916,746, filed in the U.S. Patent and Trademark Office on Jul. 22, 1992, now U.S. Pat. No. 5,355,072 issued Oct. 11, 1994.

BACKGROUND OF THE INVENTION

This invention relates to a battery discharging apparatus, and in particular to an apparatus that recovers, by deep discharge, a battery's real power capacity which has been reduced due to the memory effect.

In general, phenomenon called memory effect is well known. Memory effect, wherein battery voltage drops in two stages during deep discharge after a repetition of shallow charge-discharge cycles, occurs in rechargeable batteries such as nickel-cadmium or nickel-hydrogen batteries. Turning to FIG. 1, the dashed curve, A, represents the discharge characteristics of a battery with memory effect, while the solid curve, B, represents the discharge characteristics of a normal battery without memory effect. This figure shows that as discharge progresses, voltage drops after a shorter service time for a battery with memory effect. Consequently, when a battery with memory effect is used in equipment that cuts off at a final voltage, the battery's real power capacity is reduced.

In this way, when memory effect occurs in a rechargeable battery used as a power source in various battery driven equipment, problems occur such as the working voltage of the rechargeable battery dropping below the operating voltage of the equipment, causing the operating equipment to suddenly cease operation. On the other hand, battery driven equipment such as the eight millimeter video camera electrically disconnect the battery and cease camera operation when the battery voltage drops below the camera's operating voltage. This is to avoid unpredictable equipment behavior caused by driving the equipment at a reduced battery voltage.

Often the operating voltage for this type of equipment is set at a value that does not completely discharge the battery and leaves it with some residual power. Therefore, memory effect becomes particularly likely in these applications where the battery's charge discharge cycle is repeated.

Moderately deep discharge techniques have been developed to eliminate the memory effect (see, for example, Japanese public disclosure 198516, 1987). The discharging apparatus described in this disclosure contains a discharging means to deeply discharge a rechargeable battery when its voltage drops below a set value. The discharging means utilizes either a timer to achieve deep discharge until a set time interval has passed or a battery voltage sensor to achieve deep discharge until a set voltage is reached.

The discharging apparatus described in this disclosure is characterized in that real battery power loss due to memory effect is recovered by deep battery discharge, or namely by memory effect eliminating discharge. Thus memory effect eliminating discharge is done to recover a battery's real power capacity when it has been reduced due to memory effect. For example, memory effect eliminating discharge would be accomplished when a battery's real power capacity dropped to 80% of its normal capacity. However, even deep discharge of a battery having no real power reduction due to memory effect produces no recovery of power capacity. Memory effect eliminating discharge of a battery with no memory effect not only wastefully consumes power, but also shortens the discharge cycle lifetime of the battery. Further, performing memory effect eliminating discharge every time battery voltage drops does not recover the battery's original real power capacity.

A discharging apparatus that automatically performs memory effect eliminating discharge whenever the battery voltage drops below a set value has the drawback that since memory effect eliminating discharge is accomplished every time the battery voltage drops, time is consumed deeply discharging tile battery as well as recharging it from the deeply discharged state.

The present invention was developed to eliminate these drawbacks. It is thus a primary object of this invention to provide a battery discharging apparatus that can eliminate memory effect by discharging the battery at appropriate times.

SUMMARY OF THE INVENTION

The battery discharging apparatus of the present invention comprises a discharge means to discharge the battery and a control means to control the discharge. The control means comprises any one of the following four circuits.

(1) The control means is provided with a battery voltage sensing means and a timer activated in response to the output of the voltage sensing means. When battery voltage drops below a prescribed voltage, it is detected by the voltage sensing means, and the timer begins counting. When the timer completes its count, the control means guides the discharge means to begin battery discharge.

(2) The control means is provided with a current sensing means to determine whether or not power is being delivered by the battery, a battery voltage sensing means, and a timer activated in response to the output of the voltage sensing means. When the current sensing means determines that power is not being delivered by the battery, and when the voltage sensing means detects that battery voltage has dropped below the prescribed voltage, the timer begins counting. After a set time interval, the timer completes its count and the control means guides the discharge means to discharge the battery.

(3) The control means includes the battery discharge means, a current sensing means to determine whether or not power is being delivered by the battery, and a battery discharge switch. When tile current sensing means determines that power is not being delivered by the battery, and at the same time the discharge switch has been toggled, the discharge means discharges the battery.

(4) The control means is provided with a current sensing means, to determine whether or not power is being delivered by the battery, and a battery power capacity sensing means to detect the battery's power level. When the current sensing means determines that power is not being delivered by the battery, and when the battery power capacity sensing means detects that battery capacity has dropped below a prescribed level, the control means guides the discharge means to begin battery discharge. Thus, memory effect eliminating discharge is commenced by the discharge means.

DETAILED DESCRIPTION OF THE INVENTION

The following describes preferred embodiments of the present invention based on illustrations.

Figure 1:
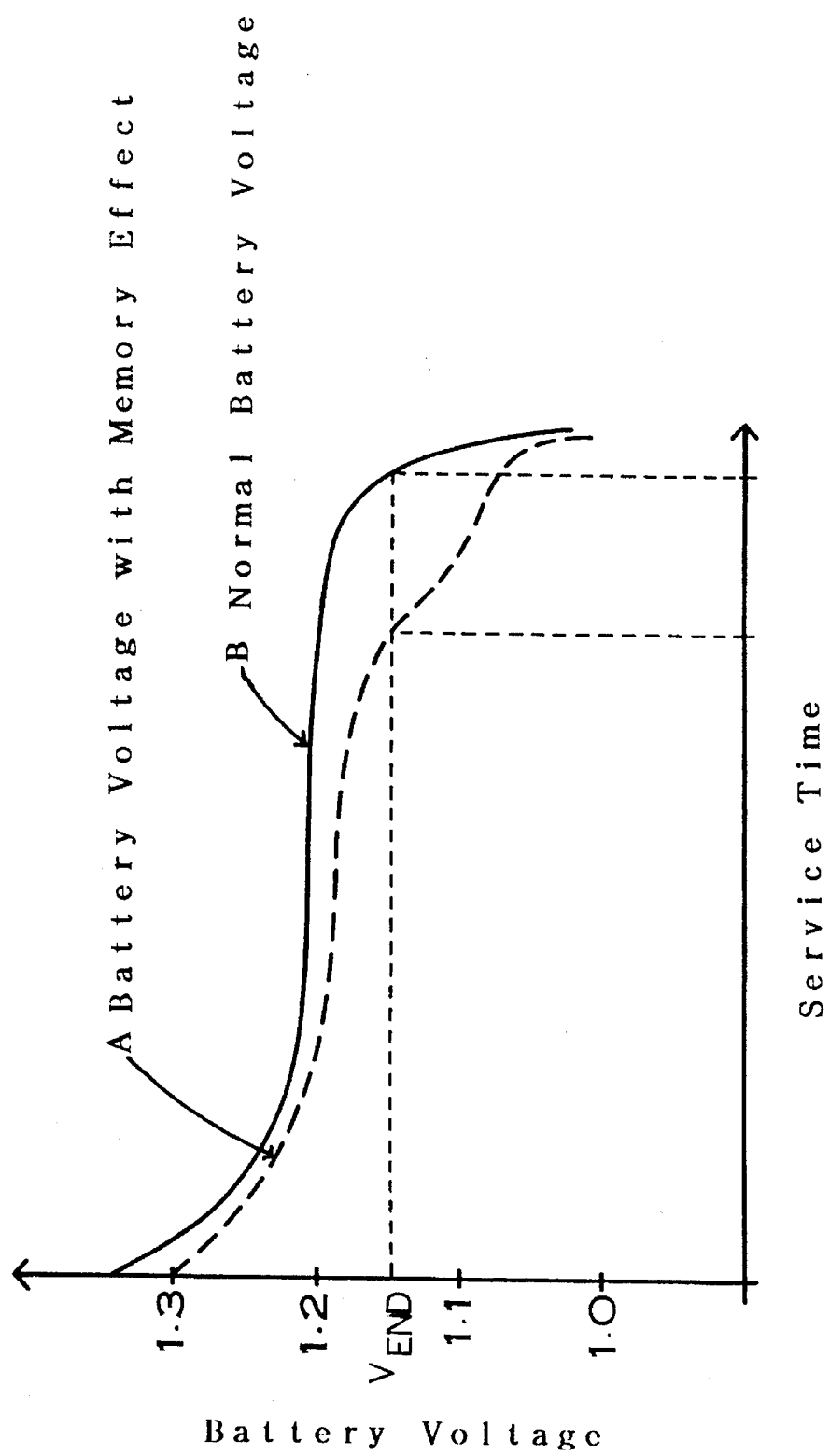
FIG. 1 is a graph showing battery voltage reduction due to memory effect.
Figure 2:
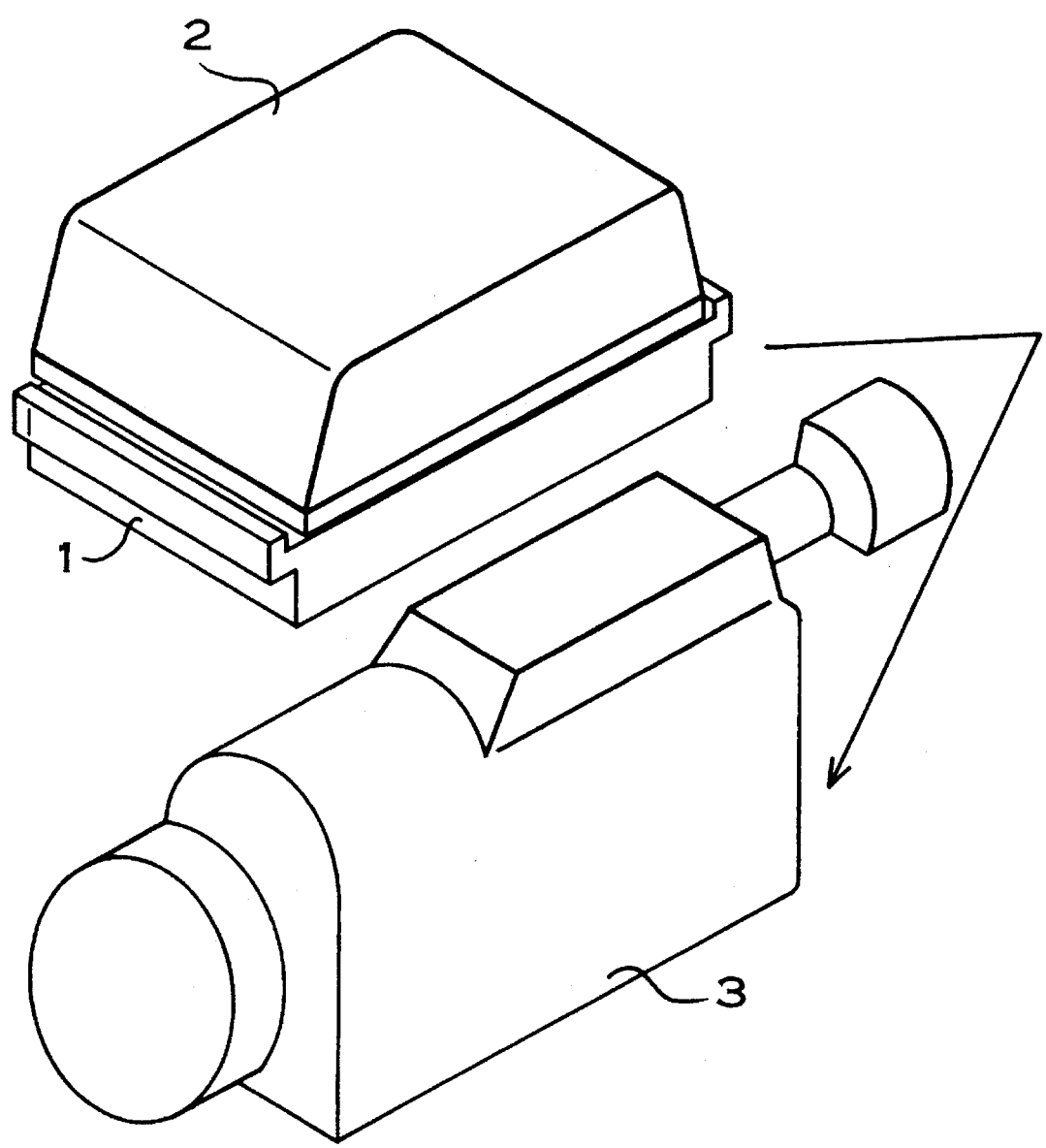
FIG. 2 is a perspective side view showing a battery pack, remaining power indicator adaptor, and eight millimeter video camera.
Figure 3:
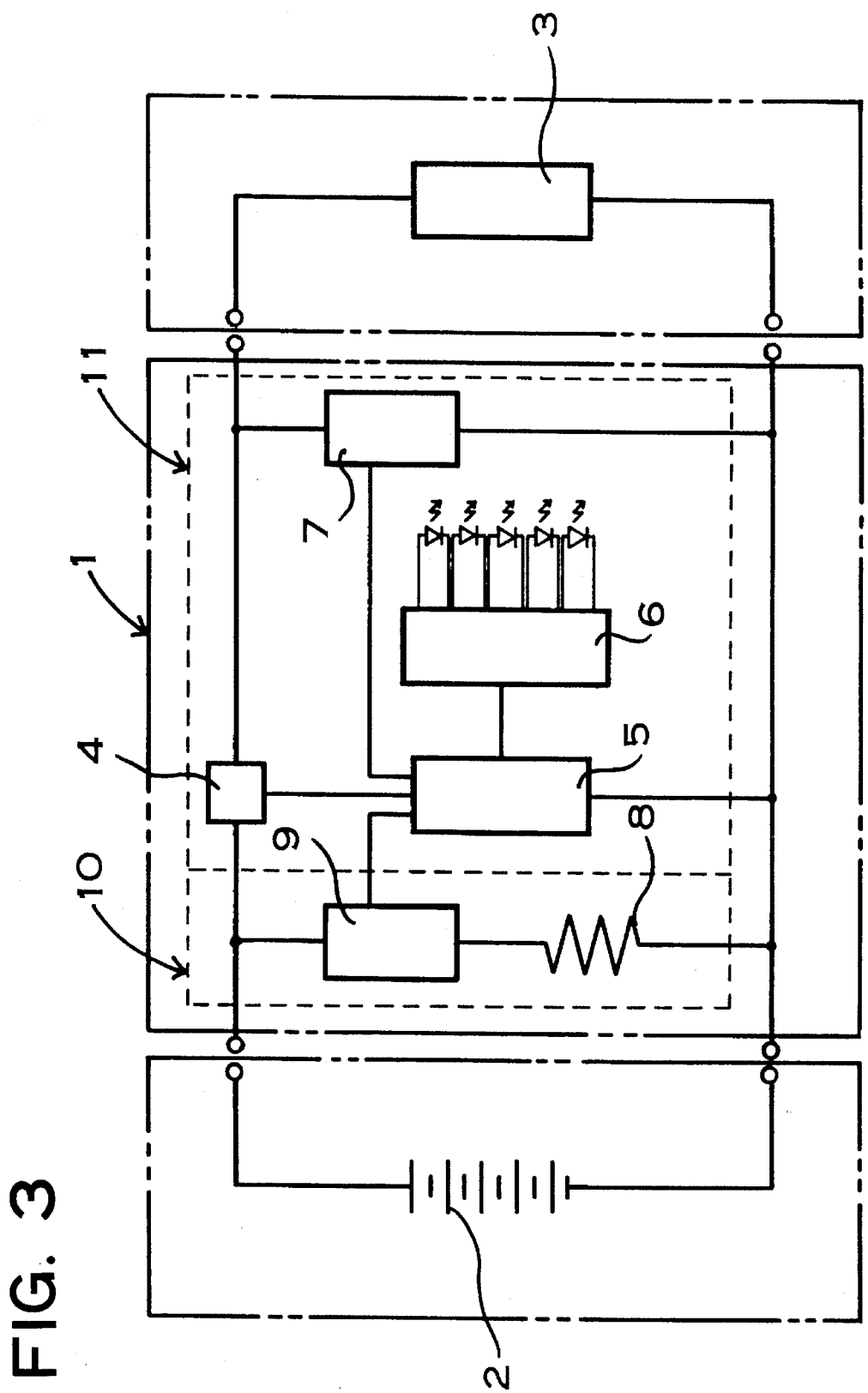
FIG. 3 is a block diagram of the first preferred embodiment of the battery discharging apparatus circuit.

Part number 1 in FIG. 2 and FIG. 3 is the remaining power indicator adaptor included in the battery discharging apparatus of this invention. This remaining power indicator adaptor 1 lies between the battery pack 2 and the eight millimeter video camera 8. Specifically, the adapter 1 is provided with mating surfaces to both the battery pack 2 and the video camera 3, and the battery pack 2 supplies power to the video camera 8 through the adapter 1. Further, as the driving power source, the battery pack's remaining power level is displayed by the adapter 1.

Turning to FIG. 3, the remaining power indicator adaptor 1 comprises a discharge means 10 and a control means 11. The control means 11 is provided with a current sensing means 4 to detect electric current flow supplied by the battery pack 2, a microcomputer 5 to integrate the output of the current sensing means 4, and a indicator means 6 to display the results of computation by the microcomputer 5. The indicator means 6 has five LED's (ligh emitting diodes) which are lighted appropriately to indicate the power level of the battery pack 2 in 20% intervals.

Further, the control means 11 included in the remaining power indicator adaptor 1 is provided with a voltage sensing means 7 to measure the voltage of the battery pack 2. The discharge means 10 is provided with a battery pack discharge resistor 8 and a switching means 9 to connect the battery pack 2 and the discharge resistor 8. The switching means 9 switches on or off depending on output from the microcomputer 5. In addition, the microcomputer 5 contains a timer circuit (not illustrated) driven by output from the voltage sensing means 7.

Figure 4:
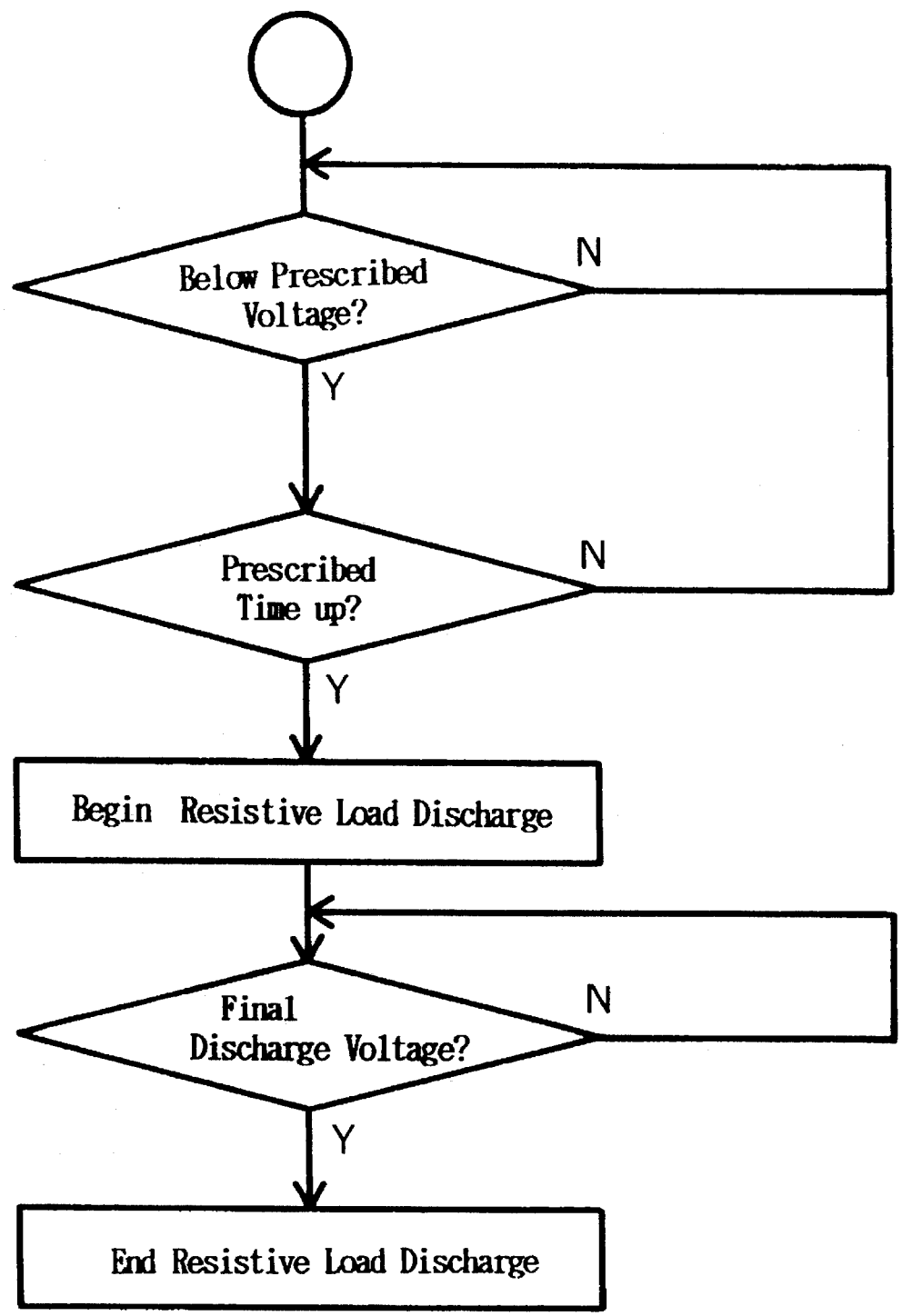
FIG. 4 is a flowchart showing the operation of the battery discharging apparatus of FIG. 3.

The remaining power indicator adaptor 1, having the component structure described above, and intervening between the battery pack 2 and the video camera 3, displays (via the indicator means 6) the remaining power of the battery pack 2 when the video camera 3 is powered. The voltage of the battery pack 2 is also measured by the voltage sensing means 7. Battery voltage drops as the video camera 3 is operated until finally the video camera's cut-off voltage is reached. When the battery voltage reaches the cut-off voltage, the video camera 3 is set up to electrically disconnect the driving the load 53, the current sensing means 54 measures battery pack 2. Here the reference voltage of the voltage sensing means 7 is set ahead of time equal to the cut-off voltage. The operation of the discharging apparatus shown in FIG. 3 is described by the flowchart of FIG. 4. As shown by this flowchart, when the battery voltage drops below the camera's cut-off voltage, the voltage sensing means 7 issues a prescribed signal to the microcomputer 5. At this instant, the microcomputer 5 activates its resident timer circuit. After the timer circuit counts off a set time interval, the microcomputer 5 issues a prescribed signal to the switching means 9, and the switching means 9 connects the battery pack 2 with the discharge resistor 8. As a result, the battery pack 2 discharges its remaining power through the discharge resistor 8. In addition, the adapter 1 measures the battery voltage during discharge through the discharge resistor 8 with the voltage sensing means 7. When the voltage drops to the final discharge voltage of 1 V per cell, the microcomputer 5 again issues a signal to the switching means 9, and the battery pack 2 is disconnected from the discharge resistor 8 ending the discharge.

In the case when the battery pack 2 is to be immediately recharged for reuse with a video camera or other load, it is immediately removed from the video camera and set on a charger to begin recharge after its voltage drops below the cut-off voltage. Under these circumstances, since the battery voltage immediately begins to rise, the battery pack 2 is not connected to the discharge resistor 8, and is quickly recharged.

However, in the case when the battery pack 2 is not used after reaching the cut-off voltage, since the battery voltage is below the cut-off voltage, the timer circuit continues its count, and as described previously, battery discharge begins after a set time interval. In this way, when the battery pack 2 is not used, it is completely discharged automatically to prevent the occurrence of memory effect. Therefore, when the battery is again charged, it can attain its full power capacity, and stable activation of the load can be guaranteed.

In the discharging apparatus described above, the battery is completely discharged after a set time interval that begins after the battery discharges to a prescribed voltage. When the battery is not used, it can be completely discharged automatically, avoiding memory effect, assuring full capacity recharge, and insuring stable power to the load.

Figure 5:
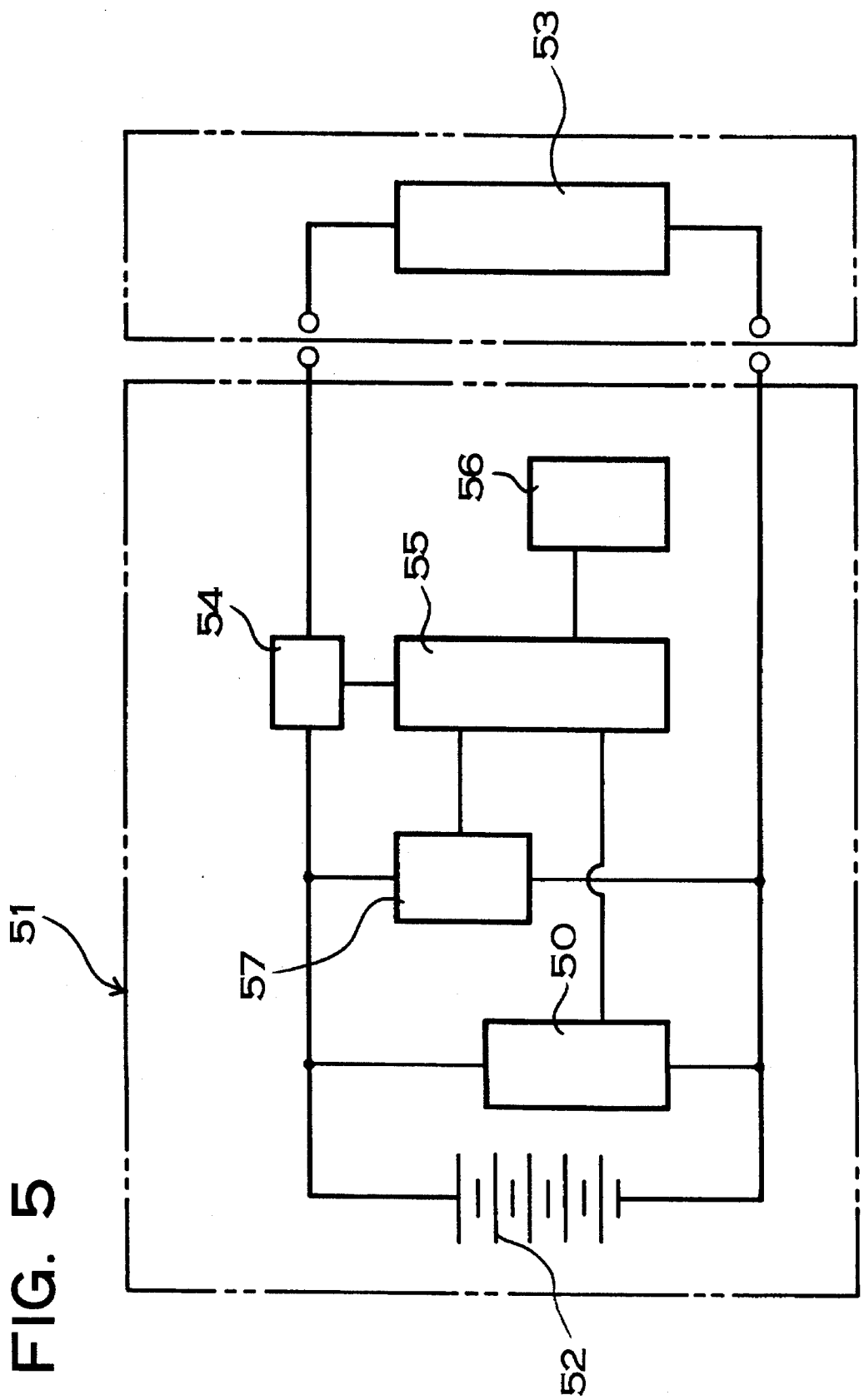
FIG. 5 is a block diagram of tile second preferred embodiment of the battery discharging apparatus circuit.
Figure 6:
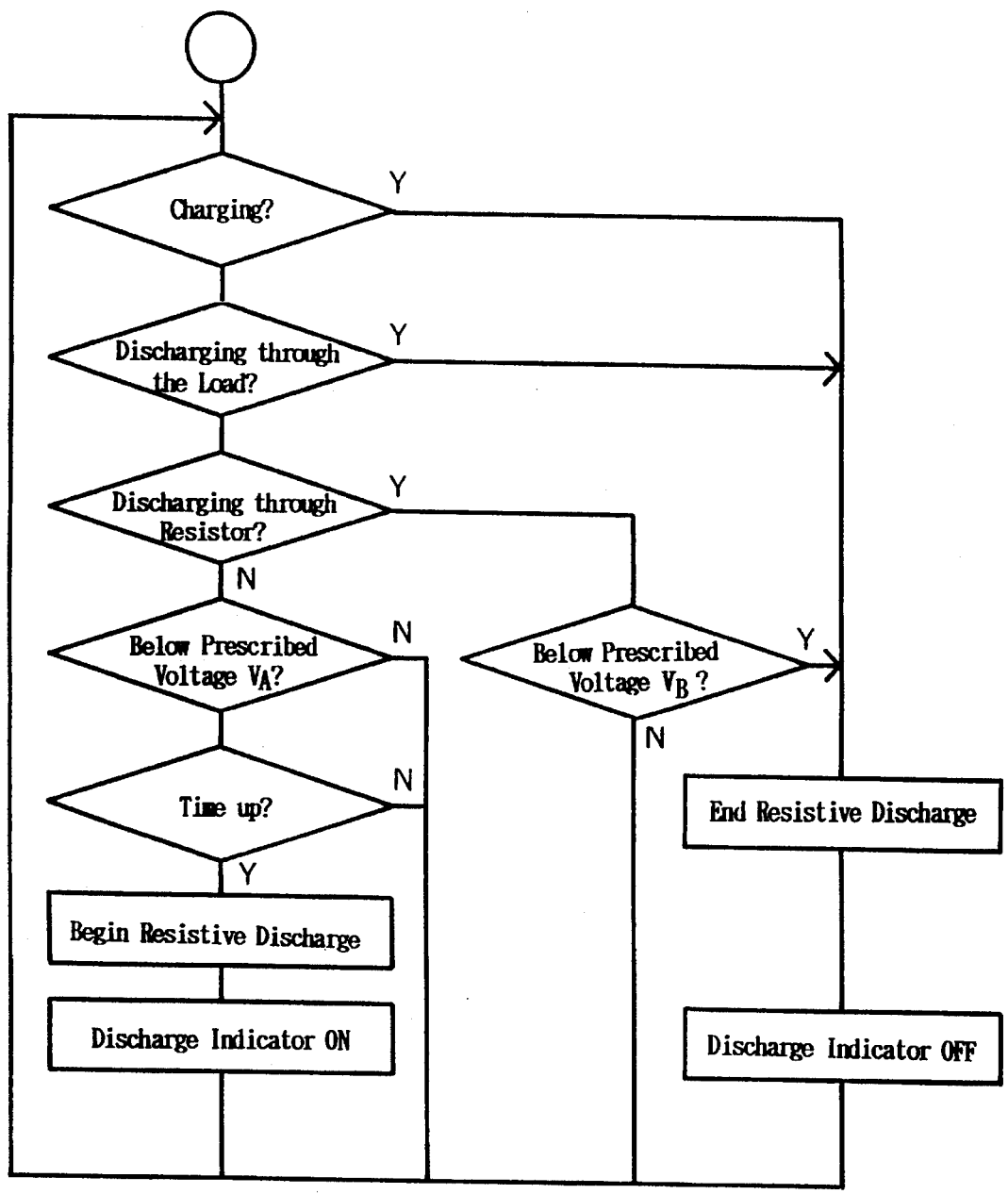
FIG. 6 is a flowchart showing the operation of the battery discharging apparatus of FIG. 5.

Turning to FIG. 5, a discharging apparatus having a different circuit configuration is shown. The microcomputer 55 shown in FIG. 5 contains a timer (not illustrated). Further, the operation of the circuit of FIG. 5 is depicted by the flowchart of FIG. 6. Specifically, when the battery pack 51 is connected to a battery charger and is being charged, the current sensing means 54 measures a charging current and issues a prescribed signal to the microcomputer 55. When this occurs, the microcomputer 55 judges that the battery cell array 52 is being charged and issues a signal to the discharge means 50 breaking any connection between the discharge means 50 and the battery cell array 52. Therefore, resistive discharge via the discharge means 50 does not take place. In addition, the indicator means 56 does not activate a display due to a signal from the microcomputer 55.

Next, when the battery pack 51 is connected to, and load current and issues a prescribed signal to the microcomputer 55. Therefore, as before, resistive discharge via the discharge means 50 does not take place.

When the battery pack 51 is neither being charged nor driving the load 58, nor being discharged through a resistor, the voltage sensing means 57 measures the battery voltage. When the battery voltage is below the prescribed voltage $V_a$, the microcomputer 55 receives a signal from the voltage sensing means 57, and activates the timer within the microcomputer 55. After a set interval timed by the timer, a signal is issued to tile discharge means 50 to connect the battery cell array 52 to the discharge means 50. Consequently, resistive discharge takes place via the discharge means 50. In addition, tile indicator means 56 receives a signal from the microcomputer 55 to activate the display. Here the prescribed voltage $V_a$, is selected to be the cut-off voltage of the load being powered. In this manner, when power is not flowing to or from the battery, when the voltage sensing means 57 measures battery voltage below the prescribed voltage, and when the timer completes counting off the set time interval, the discharge means 50 discharges the battery. Finally, during discharge through the resistor, when the battery voltage drops below the prescribed voltage $V_b$, resistive discharge is complete. The prescribed final discharge voltage $V_b$ is selected to be 1 V per battery cell.

In this embodiment, the battery discharging apparatus is contained within the battery pack 51, but it is not limited to this configuration and may be of the adapter type free to attach to, and detach from tile battery.

The discharging apparatus shown in FIG. 5 comprises a battery discharge means, a current sensing means to determine whether or not power is flowing to or from the battery, a battery voltage sensing means, and a timer activated by output from the voltage sensing means. When the current sensing means determines that power is not flowing to or from the battery, further when the voltage sensing means measures battery voltage below the prescribed voltage, and when the timer completes timing the set time interval, the discharge means discharges the battery. Therefore, automatic battery discharge can be performed at times such as after use powering the load.

Figure 7:
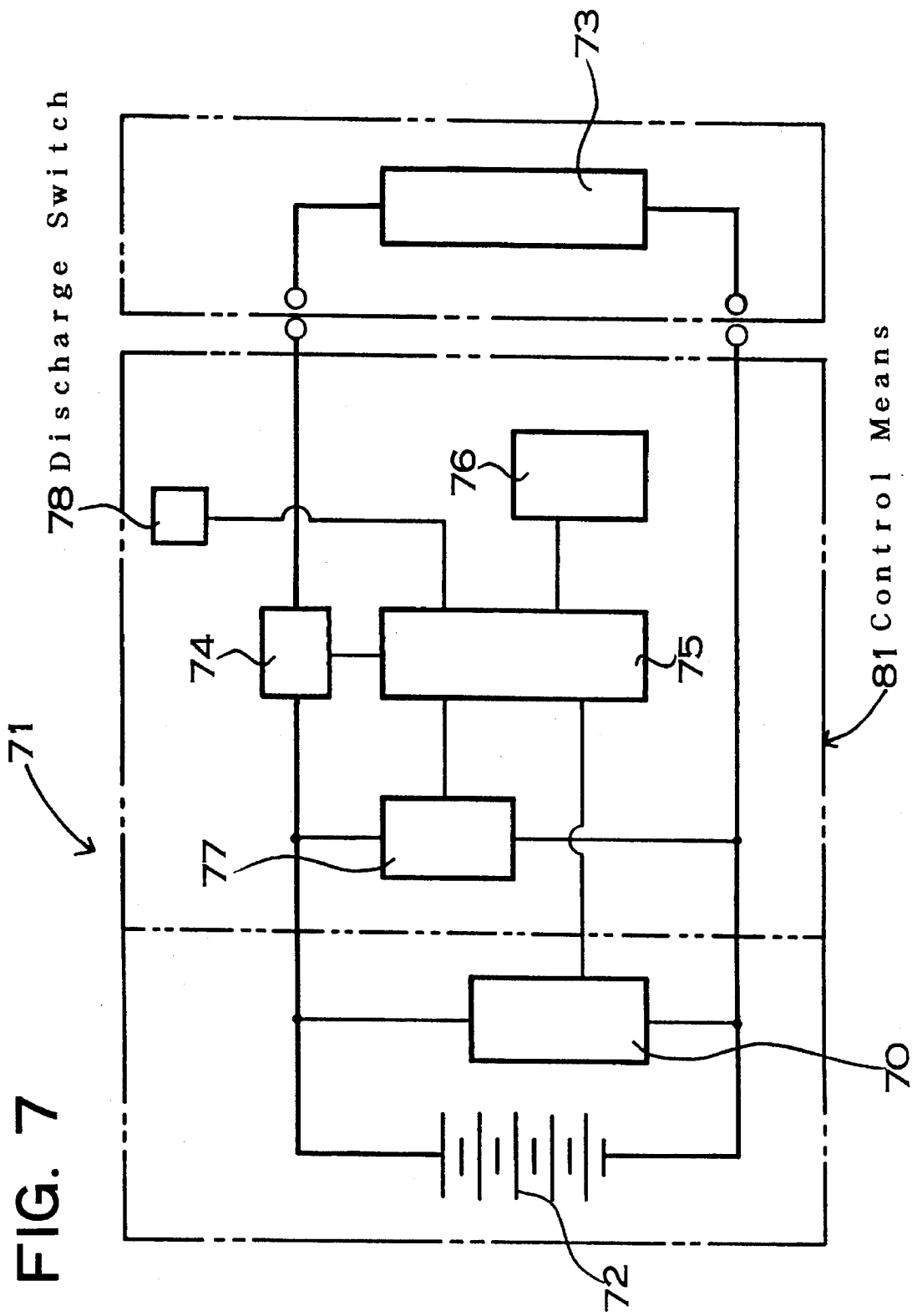
FIG. 7 is a block diagram of the third preferred embodiment of the battery discharging apparatus circuit.

Turning to FIG. 7, a discharging apparatus having a different circuit configuration is shown. This discharging apparatus is also contained within the battery pack 71. Specifically, the battery pack 71 comprises a plurality of Ni—Cd (nickel-cadmium) batteries connected in series to form a battery cell array 72, a battery cell array discharge means 70, and a control means 81 to control the discharge means 70. The control means 81 is provided with a voltage sensing means 77 which connects to both terminals of the battery cell array 72 to measure battery voltage, a current sensing means 74 which connects in series with the battery cell array 72 to determine whether or not power is flowing to or from the array, an indicator means 76 to indicate whether or not the battery cell array is being discharged via the discharge means 70, a microcomputer 75 which outputs signals to control the discharge means 70, the voltage sensing means 77, the current sensing means 74, and the indicator means 76, and a discharge switch 78 which connects to the microcomputer 75. This battery pack 71 is selected to connect with the load 73 or a battery charger (not illustrated) to drive the load or to be charged by the battery charger. The discharge means 70 includes a discharge resistor.

Figure 8:
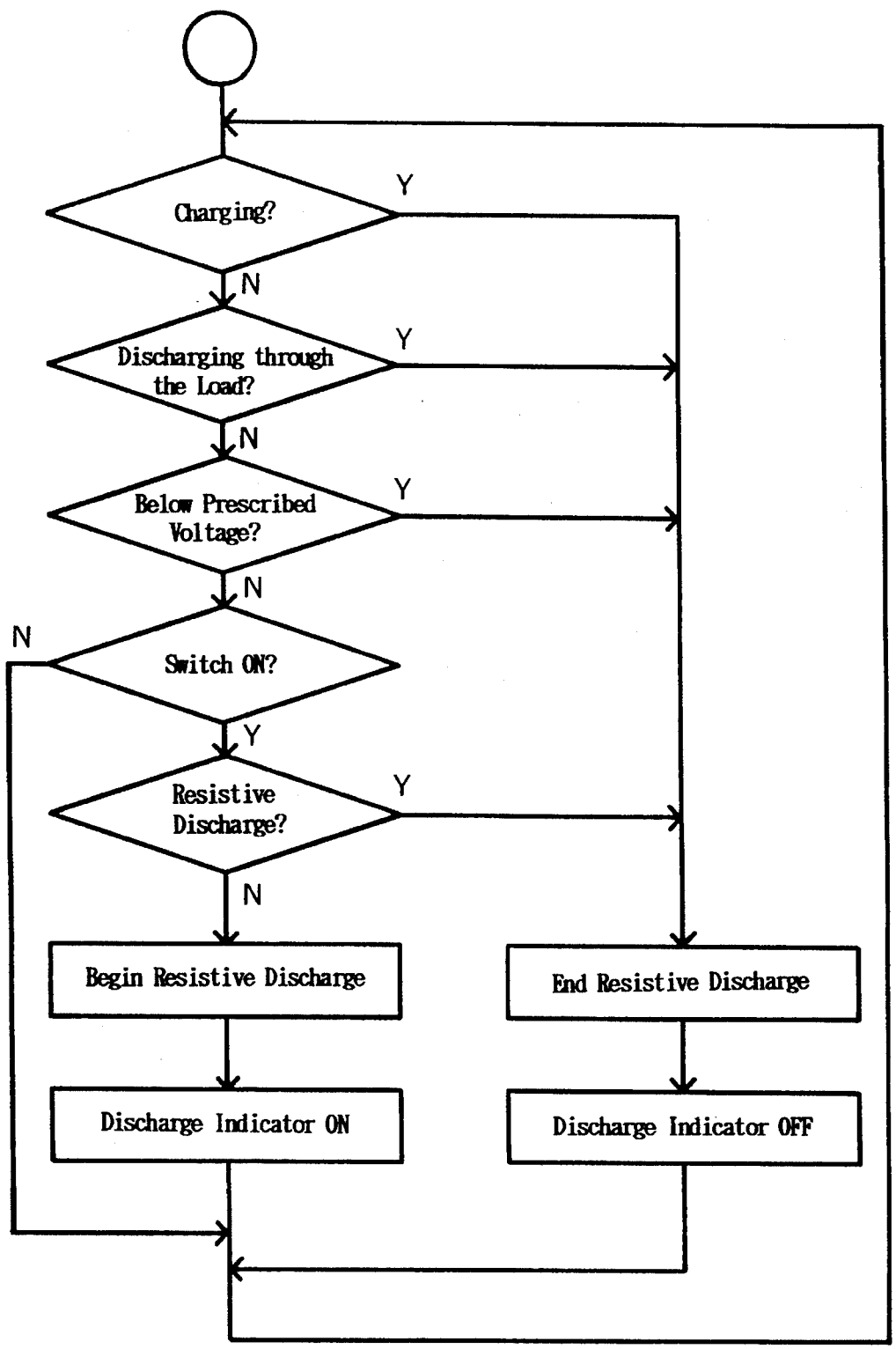
FIG. 8 is a flowchart showing the operation of the battery discharging apparatus of FIG.

The operation of the discharging apparatus of FIG. 7 having component configuration described above is explained following the flowchart of FIG. 8.

When the battery pack 71 is connected to a battery charger and is being charged, the current sensing means 74 measures a charging current and issues a prescribed signal to the microcomputer 75. When this occurs, the microcomputer 75 judges that the battery cell array 72 is being charged and issues a signal to the discharge means 70 breaking any connection between the discharge means 70 and the battery cell array 72. Therefore, resistive discharge via the discharge means 70 does not take place. In addition, the indicator means 76 receives a signal from the microcomputer 75 and does not indicate discharge.

Next, when the battery pack 71 is connected to, and driving the load 73, the current sensing means 74 measures load current and issues a prescribed signal to the microcomputer 75. Therefore, as before, resistive discharge via the discharge means 50 does not take place.

When the battery pack 71 is neither being charged nor driving the load 73, further when the voltage sensing means 77 measures the battery voltage below the prescribed voltage, the microcomputer 75 receives a signal from the voltage sensing means 77 and outputs a signal to the discharge means 70 breaking any connection between the discharge means 70 and the battery cell array 72. Therefore, resistive discharge via the discharge means 70 does not take place. In addition, the indicator means 76 receives a signal from the microcomputer 75 and does not indicate discharge. Here the prescribed voltage is selected to be the cut-off voltage of the load 73 being used.

When the battery voltage is above the prescribed voltage, the discharge switch 78 is pushed, and resistive discharge via the discharge means 70 is already taking place, the microcomputer 75 outputs a signal to the discharge means 70 breaking any connection between the discharge means 70 and the battery cell array 72. Thus, resistive discharge via the discharge means 70 is ended. In addition, the indicator means 76 receives a signal from the microcomputer 75 and does not indicate discharge. However, when resistive discharge is not taking place, the microcomputer 75 outputs a signal to the discharge means 70 to connect the battery cell array 72 to the discharge means 70. Consequently, resistive discharge takes place. In addition, tile indicator means 76 indicates that discharge is taking place.

The above operations are repeated. Specifically, when the discharge switch 78 is pushed and resistive discharge via the discharge means 70 is taking place, resistive discharge is ended. When the discharge switch 78 is pushed one more time, resistive discharge is started again. Finally as resistive discharge progresses and the battery voltage drops below the prescribed value, resistive discharge is ended.

The discharging apparatus shown in FIG. 7 comprises a battery discharge means, a current sensing ,hearts to determine whether or not power is Flowing to or from the battery, and a battery discharge switch 78. When the current sensing means determines that power is not flowing to or from the battery, and when the discharge switch is operated, the discharge means discharges the battery. Therefore, the battery can be discharged by pushing the discharge switch when, for example, the battery is not being used. Further, since battery discharge does not occur without pushing the discharge switch, the battery can be quickly recharged without further operation by simply connecting it to a battery charger.

Figure 9:
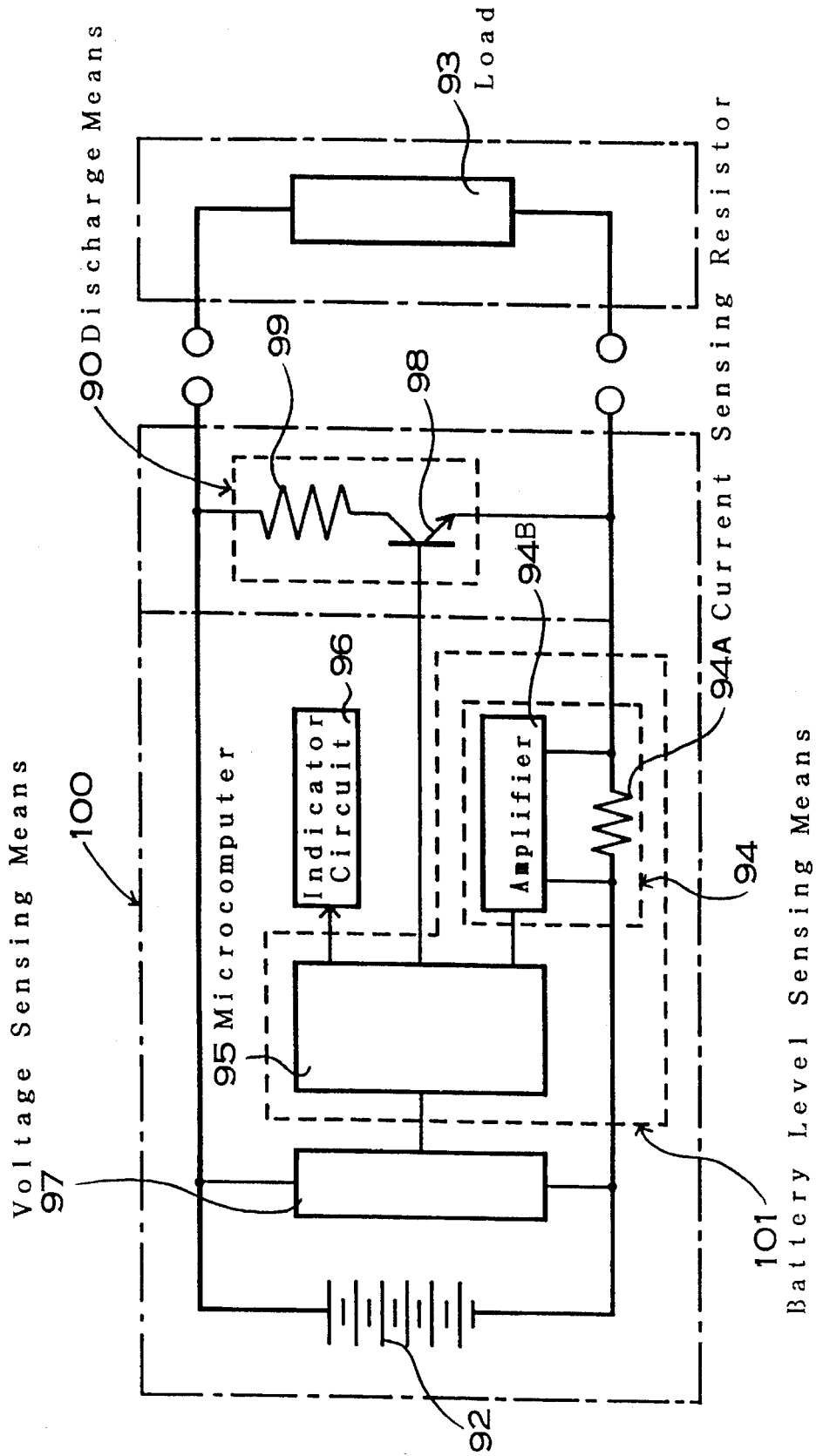
FIG. 9 is a block diagram of the fourth preferred embodiment of the battery discharging apparatus circuit.

Turning to FIG. 9, the block diagram of a discharging apparatus having a different circuit configuration is shown. The discharging apparatus of this figure is provided with a control means 100, a discharge means 90, and a indicator means 96. The control means 100 is provided with a voltage sensing means 97, a current sensing means 94, and a battery level sensing means 101.

The voltage sensing means 97 connects to both terminals of the battery cell array 92 to measure battery voltage. The current sensing means 94 connects in series with the battery cell array 92 to determine whether or not power is flowing to or from the array. The current sensing means 94 is provided, for example, with a current sensing resistor 94A connected in series with the battery, and an amplifier 94B connected with both terminals of the current sensing resistor 94A to amplify its voltage. The current sensing resistor 94A produces a voltage in proportion to the current of the battery cell array 92. When power flows to the load from the battery cell array 92 or charging current flows to the battery cell array, the current sensing means 94 outputs a signal proportional to that current. The amplifier 94B is used to limit the size of the current sensing resistor 94A and reduce measurement loss.

The battery level sensing means 101 is provided with a microcomputer 95 to compute real battery power capacity from the output signal of the current sensing means 94. Signals from both the current sensing means 94 and the voltage sensing means 97 are input to the microcomputer 95. The microcomputer 95 contains an A/D converter (not illustrated) to convert the input analog signals to digital values.

The microcomputer 95 operates on input signals from both the current sensing means 94 and tile voltage sensing means 97 to compute real battery power capacity. The microcomputer 95 computes real battery power capacity until the battery voltage drops to the final value $V_{END}$. Battery power capacity can be computed by integrating load current over time from a fully charged battery until voltage drops below the final value $V_{END}$. For example, the final voltage $V_{END}$ is set to 1.16 V per cell for NI—Cd batteries. However, the final voltage for power capacity computation $V_{END}$ is set equal to, or slightly higher than the powered equipment's cut-off voltage. For example, the powered equipment cut-off voltage is set from 1.14 V to 1.15 V. Voltage is set in this manner because battery power capacity is computed while the battery is discharging during use of the powered equipment. If the final voltage For power capacity computation $V_{END}$ were below the cut-off voltage of the powered equipment, discharge through the load would end before the power capacity computation was complete and capacity calculation would be impossible.

The discharge means 90 is connected in parallel with the battery cell array 92 and performs a deep discharge memory effect eliminating resistive discharge on a battery with reduced power capacity due to memory effect. The discharge means 90 is provided with a discharge resistor 99 and a series connected switching element 98. The switching element 98 is controlled by signals from the battery level sensing means 101. When the switching element 98 is turned on, memory effect eliminating resistive discharge is performed on the battery via the discharge resistor 99. When the switching element 98 is turned off, memory effect eliminating resistive discharge is stopped.

The indicator means 96 displays battery power capacity during normal use and indicates discharge during memory effect eliminating resistive discharge.

Figure 10:
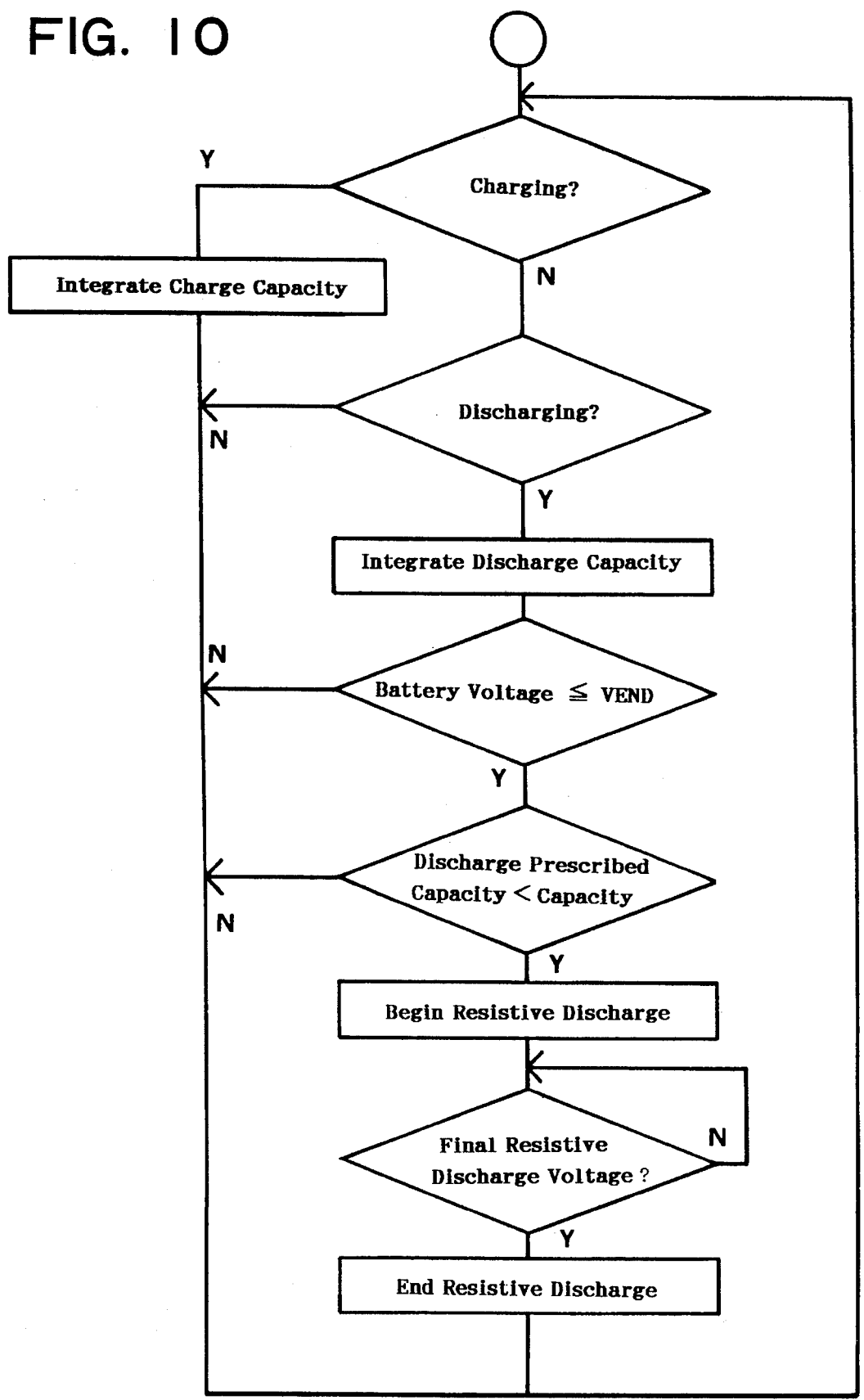
FIG. 10 is a flowchart showing the operation of the battery discharging apparatus of FIG. 9.

The discharging apparatus described above operates in the following manner depicted by the flowchart of FIG. 10, (1) Decide whether or not time battery is being charged, When the battery pack is connected to a battery charger and is being charged, the current sensing means 94 measures charging current which is input to the to the microcomputer 95, The microcomputer 95 judges that the battery cell array 92 is being charged and turns time switching element 98 of the discharge means 90 off. Therefore, when the battery cell array 92 is being charged, memory effect eliminating resistive discharge via the discharge means 90 does not take place. In addition, the indicator means 96 does not indicate discharge.

(2) When the battery is not being charged, the microcomputer 95 determines if the battery is discharging. When the battery is connected to, and supplying current to the load, the current sensing means 94 measures load current and inputs this to the microcomputer 95. In this state, the switching element 98 of the discharge means 90 is turned off and memory effect eliminating resistive discharge is not performed.

(3) When the microcomputer 95 determines from the signal from the current sensing means 92 that the battery is discharging, the microcomputer 95 integrates the current sensing means 92 signal to compute power capacity. After the integration, the microcomputer 95 compares the signal from the voltage sensing circuit with the final voltage $V_{END}$. If the battery voltage is greater than $V_{END}$, battery capacity is integrated while repeating the following loop.

integrate capacity→battery voltage<$V_{END}$?→charging?→discharging?→integrate capacity (4) When the battery voltage drops below the final value $V_{END}$, the microcomputer 95 compares the integrated battery capacity with the prescribed battery capacity. The prescribed battery capacity is set ahead of time in microcomputer 95 memory. For example, the prescribed battery capacity is set in the range 60% to 90% and preferably in the range 70% to 85% of the battery's original specified capacity. When the battery capacity is smaller than the prescribed value, the discharge means 90 begins battery discharge. While the discharge means 90 performs memory effect eliminating resistive discharge, time indicator means 96 indicates the discharge taking place.

The microcomputer 95 can also begin memory effect eliminating resistive discharge by computing power capacity From the remaining battery capacity. Remaining battery power can be computed by subtracting discharged capacity from the battery's original specified capacity. Specifically, remaining battery power can be computed by subtracting the power capacity discharged until the final voltage $V_{END}$ is reached from the battery's original specified capacity. When the remaining battery power becomes less than the prescribed capacity in microcomputer 95 memory, or similarly the discharged capacity becomes greater than a prescribed value, the microcomputer begins memory effect eliminating resistive discharge.

(5) The microcomputer 95 determines the battery voltage from the voltage sensing circuit signal and judges whether the battery voltage has reached the final discharge voltage or not. The battery is discharged until the battery voltage reaches the final discharge voltage. This discharge is a deep memory effect eliminating resistive discharge. The final discharge voltage is a voltage that discharges the battery deeply, for example, the final discharge voltage is set to 1 V per cell for Ni—Cd batteries.

Operations (1) through (5) are repeated and the battery is discharged when its power capacity decreases due to memory effect. Moreover, memory effect eliminating resistive discharge is performed after checking that the battery is neither charging nor discharging. Since the operations (1) through (5) are repeated in a loop, memory effect eliminating resistive discharge is stopped if battery charging begins, or if the battery discharges through equipment load.

The discharging apparatus shown in FIG. 9 is contained within the battery pack. It is also possible to include the discharging apparatus in the electronic equipment or in the battery charger. The battery discharging apparatus shown in FIG. 9 measures the battery's power capacity and performs memory effect eliminating resistive discharge when the power capacity decays below a fixed power capacity.

Memory effect eliminating resistive discharge serves to recover a battery's power capacity reduced due to memory effect. No power capacity recovery can take place for a battery with no power capacity reduction. Memory effect eliminating resistive discharge is begun by hand operation, when battery voltage drops below a fixed value, or when a discharged battery is not used for a set time interval. The discharging apparatus does not always deeply discharge a battery with power capacity reduced due to memory effect. On the other hand, deep discharge of a battery with no power capacity reduction consumes time during discharge as well as during recharge, and this reduces the battery's charge-discharge cycle lifetime.

The discharging apparatus shown in FIG. 9 has the feature that since memory effect eliminating resistive discharge is performed on the battery when its power capacity is reduced due to memory effect, there is no wasted discharging and recharging, and the battery is deeply discharged under ideal conditions. Furthermore, since power flow to or from the battery is sensed, memory effect eliminating resistive discharge is not started when the battery is being used. Therefore, a feature of this apparatus and memory effect eliminating resistive discharge is that when the battery is again charged, it can attain its full power capacity, and stable activation of the load can be guaranteed.

We claim:

1. A battery discharging apparatus comprising:
   (a) a discharger, said discharger selectively discharging the battery;
   (b) a controller, said controller controlling the discharger, and said controller comprising:
   (1) a battery voltage sensor, said battery voltage sensor sensing the battery voltage, and
   (2) a timer to control the discharger according to an output from the voltage sensor, wherein said voltage sensor only starts said timer when the battery voltage drops below a prescribed voltage, and said discharger only begins a battery discharge after the timer count has been completed.

2. A battery discharging apparatus as recited in claim 1, wherein said discharger comprises a discharge resistor and a switching element.

3. A battery discharging apparatus as recited in claim 1, wherein said controller contains a microcomputer.

4. A battery discharging apparatus comprising:
   (a) a discharger, said discharger selectively discharging the battery;
   (b) a controller, said controller controlling the discharger, and said controller comprising:
   (1) a current sensor, said current sensor determining whether or not power is flowing to or from the battery;
   (2) a battery voltage sensor, said battery voltage sensor sensing the battery voltage, and
   (3) a timer activated by an output from said voltage sensor, wherein when said current sensor determines that power is not flowing to or from the battery, and said voltage sensor measures a battery voltage below a prescribed voltage, said timer only starts to count when both power is determined not to be flowing and the battery voltage is determined to be below said prescribed voltage, and said discharger only begins a battery discharge after the timer count has been completed.

5. A battery discharging apparatus as recited in claim 2, wherein said discharger comprises a discharge resistor and a switching element.

6. A battery discharging apparatus as recited in claim 2, wherein said controller contains a microcomputer.

* * * * *